(12) United States Patent
Blauvelt et al.

(10) Patent No.: US 7,646,957 B2
(45) Date of Patent: *Jan. 12, 2010

(54) MULTIPLE-CORE PLANAR OPTICAL WAVEGUIDES AND METHODS OF FABRICATION AND USE THEREOF

(75) Inventors: Henry A. Blauvelt, San Marino, CA (US); David W. Vernooy, Sierra Madre, CA (US)

(73) Assignee: HOYA Corporation USA, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/119,987

(22) Filed: May 13, 2008

(65) Prior Publication Data

US 2008/0232756 A1 Sep. 25, 2008

Related U.S. Application Data

(63) Continuation of application No. 11/623,610, filed on Jan. 16, 2007, now Pat. No. 7,373,067, which is a continuation of application No. 11/058,535, filed on Feb. 15, 2005, now Pat. No. 7,164,838.

(51) Int. Cl.
*G02B 6/10* (2006.01)
(52) U.S. Cl. .................................................... 385/131
(58) Field of Classification Search .......... 385/129–132
See application file for complete search history.

(56) References Cited

U.S. PATENT DOCUMENTS

| | | | |
|---|---|---|---|
| 4,799,749 A | 1/1989 | Borner et al. |
| 5,119,460 A | 6/1992 | Bruce et al. |
| 5,159,699 A | 10/1992 | de Monts |
| 5,481,632 A | 1/1996 | Hirai et al. |
| 6,034,983 A | 3/2000 | Fujii et al. |
| 6,282,335 B1 | 8/2001 | Losch et al. |

(Continued)

FOREIGN PATENT DOCUMENTS

WO WO 02/21176 3/2002

(Continued)

OTHER PUBLICATIONS

Hilleringmann et al, Optoelectronic System Integration on Silicon:Waveguides, Photodetectors, and VLSI CMOS Circuits on One Chip, IEEE Transactions on Electron Devices, May 1995, pp. 841-846, vol. 42, No. 5.

(Continued)

*Primary Examiner*—Sarah Song
(74) *Attorney, Agent, or Firm*—David S. Alavi

(57) ABSTRACT

A multiple-core optical waveguide comprises: a substrate; lower and upper waveguide core layers; a waveguide core between the upper and lower waveguide core layers; upper and lower cladding; and middle cladding between the upper and lower waveguide core layers substantially surrounding the waveguide core. Each of the lower, middle, and upper claddings has a refractive index less than refractive indices of the lower waveguide core layer, the upper waveguide core layer, and the waveguide core. Along at least a given portion of the optical waveguide, the upper and lower waveguide core layers extend bilaterally substantially beyond the lateral extent of a propagating optical mode supported by the optical waveguide, the lateral extent of the supported optical mode being determined at least in part by the width of the waveguide core along the given portion of the optical waveguide.

21 Claims, 4 Drawing Sheets

U.S. PATENT DOCUMENTS

| | | | |
|---|---|---|---|
| 6,330,378 | B1 | 12/2001 | Forrest et al. |
| 6,385,376 | B1 | 5/2002 | Bowers et al. |
| 6,411,765 | B1 | 6/2002 | Ono |
| 6,483,863 | B2 | 11/2002 | Forrest et al. |
| 6,487,350 | B1 | 11/2002 | Veligdan et al. |
| 6,575,798 | B2 | 6/2003 | Maurel |
| 6,600,847 | B2 | 7/2003 | Saini et al. |
| 6,608,947 | B2 | 8/2003 | Margalit et al. |
| 6,744,953 | B2 | 6/2004 | Lemoff et al. |
| 6,819,853 | B2 | 11/2004 | Lam et al. |
| 6,870,992 | B2 | 3/2005 | Grosjean et al. |
| 6,884,327 | B2 | 4/2005 | Pan et al. |
| 6,975,798 | B2 | 12/2005 | Blauvelt et al. |
| 6,981,806 | B2 | 1/2006 | Benzoni et al |
| 6,985,646 | B2 | 1/2006 | Blauvelt et al. |
| 6,987,913 | B2 | 1/2006 | Blauvelt et al. |
| 7,050,681 | B2 | 5/2006 | Blauvelt et al. |
| 7,095,920 | B1 | 8/2006 | Little |
| 7,095,928 | B2 | 8/2006 | Blauvelt et al. |
| 7,136,564 | B2 | 11/2006 | Blauvelt et al. |
| 7,158,702 | B2 | 1/2007 | Blauvelt et al. |
| 7,164,825 | B2 | 1/2007 | Blauvelt et al. |
| 7,164,838 | B2 * | 1/2007 | Blauvelt et al. ............ 385/131 |
| 7,184,643 | B2 | 2/2007 | Blauvelt et al. |
| 7,233,713 | B2 | 6/2007 | Blauvelt et al. |
| 7,269,317 | B2 | 9/2007 | Blauvelt et al. |
| 7,330,619 | B2 | 2/2008 | Vernooy et al. |
| 7,373,067 | B2 * | 5/2008 | Blauvelt et al. ............ 385/131 |
| 7,379,638 | B2 | 5/2008 | Blauvelt et al. |
| 7,394,954 | B2 | 7/2008 | Blauvelt et al. |
| 7,397,995 | B2 | 7/2008 | Blauvelt et al. |
| 7,542,636 | B2 | 6/2009 | Blauvelt et al. |
| 7,542,638 | B2 | 6/2009 | Blauvelt et al. |
| 2002/0037141 | A1 | 3/2002 | Miyamoto et al. |
| 2002/0181829 | A1 | 12/2002 | Margalit et al. |
| 2003/0039439 | A1 | 2/2003 | Deliwala |
| 2003/0081922 | A1 | 5/2003 | Ide |
| 2003/0235371 | A1 | 12/2003 | Shimada et al. |
| 2004/0013384 | A1 | 1/2004 | Parker et al. |
| 2007/0211989 | A1 | 9/2007 | Blauvelt et al. |
| 2007/0242917 | A1 | 10/2007 | Blauvelt et al. |
| 2008/0226224 | A1 | 9/2008 | Blauvelt et al. |
| 2009/0052841 | A1 | 2/2009 | Vernooy et al. |

OTHER PUBLICATIONS

Hoffman et al, Low-Loss Fiber-Matched Low-Temperature PECVD Waveguides with Small-Core Dimensions for Optical Communications Systems, IEEE Photonics Technology Letters, Sep. 1997, pp. 1238-1240, vol. 9, No. 9.

Horst et al., Compact, Tunable Optical Devices in Silicon-Oxynitride Waveguide Technology, Proc. Topical Meeting on Integrated Photonics Research, IPR 2000, 1999, Published in: Quebec Canada.

Kimerling, Photons to the Rescue: Microelectronics Becomes Microphotonics, Interface, Jun. 2000, pp. 28-31, vol. Summer 2000, Publisher: The Electrochemical Society.

Liu et al, Fused InP-GaAs Vertical Coupler Filters, IEEE Photonics Technology Letters, Jan. 1999, pp. 93-95, vol. 11, No. 1.

Li et al, Silicon Optical Bench Waveguide Technology, Optical Fiber Telecommunications, 1997, pp. 319-376, vol. IIIB, Publisher: Academic Press, Published in: US.

Li et al, Silica-based optical integrated circuits, IEE Proc.-Optoelectron., Oct. 1996, pp. 263-280, vol. 143, No. 5.

Offrein et al, Resonant Coupler-Based Tunable Add-After-Drop Filter in Silicon-Oxynitride Technology for WDM Networks, IEEE Journal of Selected Topics in Quantum Electronics, Sep. 1999, pp. 1400-1406, vol. 5, No. 5..

De Ridder et al, Silicon Oxynitride Planar Waveguiding Structure for Application in Optical Communication, IEEE Journal of Selected Topics in Quantum Electronics, Nov. 1998, pp. 930-937, vol. 4, No. 6.

Shani et al, Efficient coupling of a semiconductor laser to an otpical fiber by means of a tapered waveguide on silicon, Applied Physics Letters, Dec. 4, 1998, pp. 2389-2391, vol. 55, No. 23.

International Search Report for co-owned PCT App No. PCT/US2003/020330.

International Search Report for co-owned PCT App No. PCT/US2004/013290.

International Search Report for co-owned PCT App No. PCT/US2006/005176.

Office Action dated Dec. 5, 2005 for co-owned U.S. Appl. No. 10/836,641 (now Pat No. 7,184,643).

Office Action dated Feb. 21, 2006 for co-owned U.S. Appl. No. 10/836,641 (now Pat No. 7,184,643).

Office Action dated Aug. 2, 2006 for co-owned U.S. Appl. No. 10/836,641 (now Pat No. 7,184,643).

Notice of Allowance dated Oct. 19, 2006 for co-owned U.S. Appl. No. 10/836,641 (now Pat No. 7,184,643).

Office Action dated Sep. 13, 2007 for co-owned U.S. App No. 11/678,055 (now Pat No. 7,397,995).

Notice of Allowance dated Mar. 25, 2008 for co-owned U.S. Appl. No. 11/678,055 (now Pat No. 7,397,995).

Office Action dated Mar. 23, 2006 for co-owned U.S. Appl. No. 11/058,535 (now Pat No. 7,164,838).

Notice of Allowance dated Sep. 13, 2006 for co-owned U.S. Appl. No. 11/058,535 (now Pat No. 7,164,838).

Office Action dated May 29, 2007 for co-owned U.S. Appl. No. 11/623,610 (now Pat No. 7,373,067).

Notice of Allowance dated Jan. 28, 2008 for co-owned U.S. Appl. No. 11/623,610 (now Pat No. 7,373,067).

* cited by examiner

MULTIPLE-CORE PLANAR OPTICAL WAVEGUIDES AND METHODS OF FABRICATION AND USE THEREOF

BENEFIT CLAIMS TO RELATED APPLICATIONS

This application is a continuation of U.S. non-provisional application Ser. No. 11/623,610 filed Jan. 16, 2007 (now U.S. Pat. No. 7,373,067), which is a continuation of U.S. non-provisional application Ser. No. 11/058,535 filed Feb. 15, 2005 (now U.S. Pat. No. 7,164,838), both of said applications being hereby incorporated by reference as if fully set forth herein.

BACKGROUND

The field of the present invention relates to optical waveguides. In particular, multiple-core planar optical waveguides are disclosed herein, as well as methods of fabrication and use thereof.

Planar optical waveguides fabricated on waveguide substrates may be incorporated into a variety of optical assemblies. Such optical waveguides may be fabricated with multiple cores or core layers. The use of such multiple-core planar optical waveguides may be advantageous in a variety of ways, as set forth hereinbelow.

Subject matter disclosed in this application may be related to subject matter disclosed in: (i) U.S. non-provisional application Ser. No. 10/836,641 filed Apr. 29, 2004 (now U.S. Pat. No. 7,184,643); (ii) U.S. non-provisional application Ser. No. 10/682,768 filed Oct. 9, 2003 (now U.S. Pat. No. 7,031,575); (iii) U.S. non-provisional application Ser. No. 10/661,709 filed Sep. 12, 2003 (now U.S. Pat. No. 6,992,276); and (iv) U.S. non-provisional application Ser. No. 10/609,018 filed Jun. 27, 2003 (now U.S. Pat. No. 6,975,798). Each of said non-provisional applications is hereby incorporated by reference as if fully set forth herein.

SUMMARY

A multiple-core optical waveguide comprises: a substantially planar waveguide substrate; a lower waveguide core layer; an upper waveguide core layer; a waveguide core between the upper and lower waveguide core layers; lower cladding between the substrate and the lower waveguide core layer; upper cladding above the upper waveguide core layer; and middle cladding between the upper and lower waveguide core layers substantially surrounding the waveguide core. Each of the lower, middle, and upper claddings has a refractive index less than refractive indices of the lower waveguide core layer, the upper waveguide core layer, and the waveguide core. Along at least a given portion of the optical waveguide, the upper and lower waveguide core layers extend bilaterally substantially beyond the lateral extent of a propagating optical mode supported by the optical waveguide, the lateral extent of the supported optical mode being determined at least in part by the width of the waveguide core along the given portion of the optical waveguide. Along the given portion of the optical waveguide, the upper and lower waveguide core layers and the waveguide core are arranged so that the supported optical mode is substantially confined bilaterally by the waveguide core, from below by the lower waveguide core layer, and from above by the upper waveguide core layer. The optical waveguide may further comprise a second waveguide core. The waveguide cores may taper in various ways so as to effect mode conversions by optical coupling between the waveguide cores. The waveguide may terminate at an end face thereof for optical end-coupling with an optical fiber or with a planar waveguide, and a terminal segment of the waveguide may be adapted for such end-coupling.

The waveguide may be fabricated by: forming a lower cladding layer on a waveguide substrate; forming a lower waveguide core layer on the lower cladding layer; forming a lower portion of a middle cladding layer on the lower core layer; forming a waveguide core on the lower portion of the middle cladding layer; forming an upper portion of the middle cladding layer over the waveguide core and on exposed areas of the lower portion of the middle cladding layer; forming an upper waveguide core layer on the upper portion of the middle cladding layer; and forming an upper cladding layer on the upper waveguide core layer. Spatial patterning of various waveguide cores, core layers, or claddings may be done sequentially or concurrently.

Objects and advantages pertaining to multiple-core planar optical waveguides as disclosed herein may become apparent upon referring to the disclosed exemplary embodiments as illustrated in the drawings and disclosed in the following written description or claims.

Figure 1A:
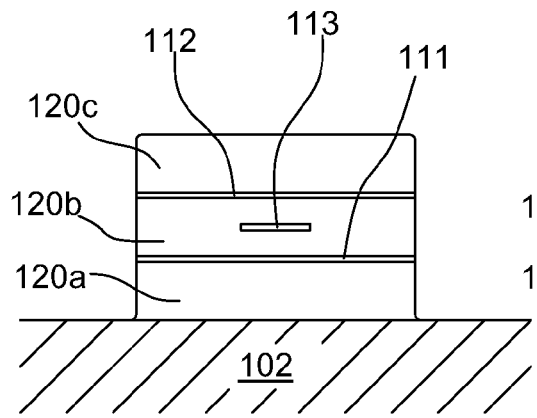
FIGS. 1A-1E are cross-sectional views of exemplary multiple-core optical waveguides.

The embodiments shown in the Figures are exemplary, and should not be construed as limiting the scope of the present disclosure and/or appended claims. It should be noted that the relative sizes or proportions of structures shown in the Figures may in some instances be distorted to facilitate illustration of the disclosed embodiments.

DETAILED DESCRIPTION OF EMBODIMENTS

Exemplary embodiments of a multiple-core low-contrast planar waveguide are shown in cross-section in FIGS. 1A-1E positioned on a waveguide substrate 102. Substrate 102 may comprise a semiconductor substrate such as silicon in this example, although any suitable substrate material may be employed. In this example, low-contrast waveguide core 113 comprises doped silica and is surrounded by lower-index middle cladding layer 120b, which comprises doped or undoped silica with a refractive index between about 1.44 and 1.46. The terms "low-contrast" or "low-index-contrast" as used herein shall denote index contrast less than about 5%. The index contrast between waveguide core 113 and middle cladding 120b in this example is less than about 5%, or may be between about 0.5% and about 3%, or may be between about 1% and about 2%. For example, core 113 may have an index typically between about 1.46 and about 1.48. Middle cladding layer 120b and core 113 therein are disposed between two doped silica core layers 111 and 112, which are in turn disposed between lower-index upper cladding 120c and lower-index lower cladding 120a. Cladding layers 120a and 120c in this example comprise doped or undoped silica with refractive indices similar to or the same as middle cladding 120b. Core layers 111 and 112 may comprise doped silica, with refractive indices larger than those of the cladding layers 120a, 120b, and 120c, and similar to or the same as the refractive index of waveguide core 113. Any other suitable materials may be employed for forming core 113, core layers 111 and 112, or claddings 120a, 120b, or 120c.

Figure 1B:
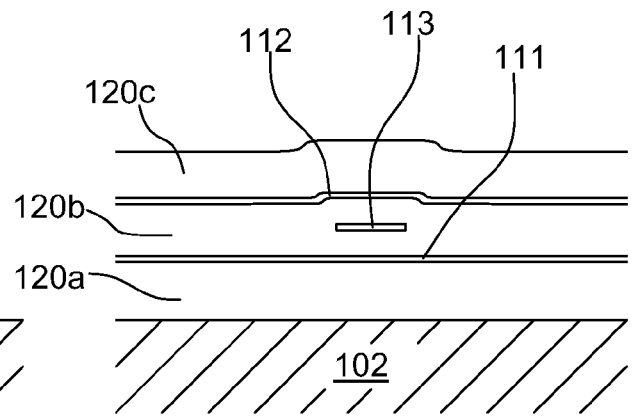
Figure 1C:
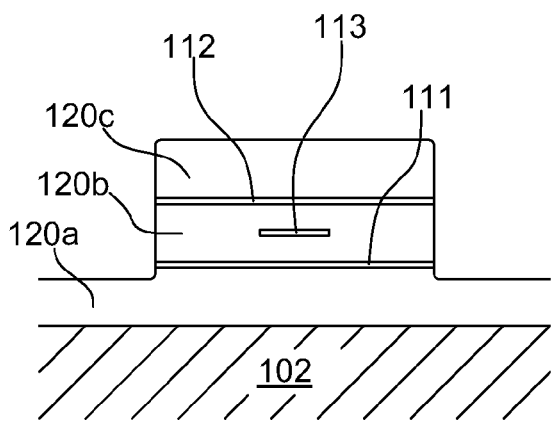
Figure 1D:
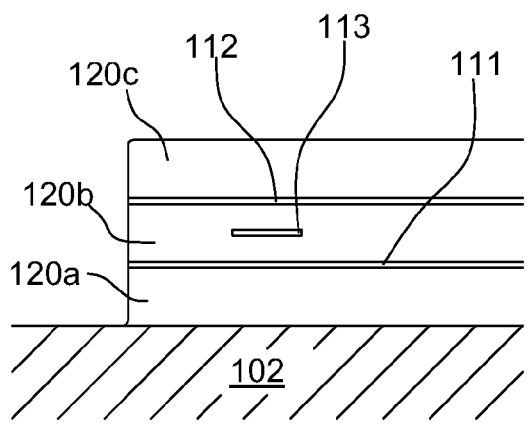
Figure 1E:
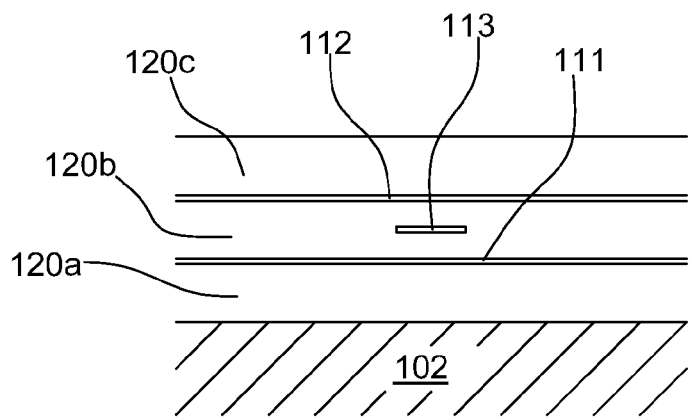

In the examples of FIGS. 1B and 1E, the core layers 111 and 112 extend bilaterally substantially beyond the transverse extent of a propagating optical mode supported by the waveguide. Such an optical mode is typically confined laterally by the waveguide core 113, and the transverse extent of core 113 at least in part determines the transverse extent of the supported optical mode. In the examples of FIGS. 1A, 1C, and 1D, cladding layers 120a, 120b, or 120c may be formed so as to yield a protruding lateral surface terminating core layer(s) 111 and/or 112. Such lateral surfaces may be provided at varying depths, and may or may not extend downward near or beyond the depth of core 113. A waveguide may be formed to include multiple segments having various of the configurations shown in FIG. 1A-1E. In some embodiments having one or two lateral protruding surfaces, core layers 111 and 112 may extend bilaterally substantially beyond the transverse extent of a supported optical mode. Alternatively, in other embodiments the transverse extent of a supported optical mode may be in part determined by the transverse extent of the core layers 111 and 112 (if they terminate sufficiently close to waveguide core 113), or by the presence of the lateral protruding surface (if it is formed sufficiently close to waveguide core 113). In all of the exemplary multiple-core low-contrast waveguides of FIGS. 1A-1E, a supported propagating optical mode is substantially confined vertically by core layers 111 and 112, while the presence of core 113 influences the details of the spatial mode profile (along the vertical dimension) near its center.

In an exemplary multiple-core low-contrast waveguide with silica or doped silica core, core layers, and claddings as described above, waveguide core 113 may be about 0.7 μm thick by about 8 μm wide, core layers 111 and 112 may each be about 0.6 μm thick, and the thickness of middle cladding 1120b separating core 113 from each of the core layers 111 and 112 may be about 1.5 μm. At a wavelength of about 1.3-1.5 μm, these dimensions may yield a transverse mode size of around 8 μm high by around 10 μm wide (mode sizes expressed as $1/e^2$ HW power). Other dimensions or indices for the core, core layers, or claddings may be chosen to yield suitable mode size and shape within the scope of the present disclosure. A suitable mode size and shape may be chosen for spatial-mode matching with an optical fiber mode or a mode of another optical waveguide, for example, thereby enabling end-coupling with reduced level of diffractive optical loss. Core 113 may range from about 0.3 μm thick up to about 1 μm thick, and between about 3 μm wide and about 12 μm wide. In some instances where single-mode behavior is not required, core 113 may be as wide as about 15 μm or about 20 μm. Core layers 111 and 112 may range from about 0.3 μm thick up to about 2 μm thick. Refractive indices for core 113 and core layers 111/112 typically range between about 1.46 and about 1.48, while that of the claddings 120a/120b/120c typically range between about 1.44 and 1.46. Any other suitable indices may be employed within one or more of the index-contrast ranges given above. The portions of cladding 120b separating core 113 from core layers 111/112 may range between about 1 μm thick and about 3 μm thick. Specific combinations of dimensions will depend on the desired spatial mode characteristics and the particular degree of index contrast employed. In addition to doped and undoped silica, other suitable core and cladding materials may be equivalently employed. As in the previous examples, lower cladding layer 120a below core layer 111 may be sufficiently thick so as to reduce or substantially eliminate optical leakage from the waveguide into substrate 102 (within operationally acceptable limits), or a reflective coating between the cladding and the substrate may be employed (as described hereinabove). The lower cladding may be greater than about 5 μm thick, or between about 6 μm thick and about 12 μm thick or between about 8 μm thick and about 10 μm thick. Similarly, upper cladding layer 1120c above upper core layer 112 may be sufficiently thick so as to reduce or substantially eliminate optical leakage through the upper surface of the waveguide (within operationally acceptable limits) or to substantially isolate a supported optical mode from a use environment (within operationally acceptable limits). The upper cladding may be greater than about 5 μm thick, or between about 6 μm thick and about 12 μm thick or between about 8 μm thick and about 10 μm thick.

Fabrication of a multiple-core low-contrast waveguide, such as the examples shown in FIGS. 1A-1E, typically begins with deposition (in order) of lower cladding 120a, core layer 111, and a lower portion of cladding 120b. Waveguide core 113 is then formed on the substantially planar upper surface of the deposited cladding 120b, typically by spatially-selective deposition or by substantially uniform deposition followed by spatially-selective removal. After forming core 113, additional cladding 120b is deposited, which may or may not comprise the same material as that deposited to form the lower portion of cladding 120b. If a deposition process having a substantial degree of conformality is employed, the upper surface of cladding 120b may exhibit a raised portion directly above waveguide core 113. Upper core layer 112 may be deposited directly on such a non-planar cladding surface, resulting in a corresponding raised portion of core layer 112 directly over waveguide core 113. Upper cladding 120c may be deposited on the non-planar core layer 112, resulting in a corresponding non-planar upper surface of cladding layer 120c. The multiple-core low-contrast waveguide resulting from this exemplary fabrication sequence would resemble the exemplary embodiment shown in FIG. 1B. If a deposition process for cladding 120b is employed that yields a substantially flat upper surface regardless of underlying topology, or if a non-planar upper surface of cladding 120b is substantially planarized prior to deposition of core layer 112 thereon, then the resulting multiple-core waveguide would resemble the exemplary embodiment shown in FIG. 1E. In either case (planar or non-planar core layer 112) the resulting waveguide may be further processed to yield protruding lateral surfaces as shown in FIG. 1A, 1C, or 1D, if needed or desired. For relatively low index contrast (less than about 5%, for example), and sufficiently thin waveguide core 113 (less than about 1 μm, for example), a multiple-core waveguide with a non-planar upper core layer 112 exhibits optical performance characteristics substantially similar to those exhibited by a multiple-core waveguide with a substantially planar upper core layer 112.

Exemplary multiple-core planar optical waveguides are shown in FIGS. 2A-2E that also include a high-contrast core. As in the preceding examples, substrate 202 may comprise silicon, although any suitable substrate material(s) may be employed, and cladding layers 220a, 220b, and 220c may comprise doped or undoped silica of suitable thicknesses (index between about 1.44 and about 1.46), although any suitable cladding material(s) may be employed. In this example, a high-index-contrast waveguide core 213b may comprise a layer of silicon nitride or silicon oxynitride a few tens to a few hundreds of nanometers in thickness, and several microns in width (high-index-contrast, greater than about 5%). The high-contrast core 213b may extend along the entire waveguide, or may extend along only one or more segments of the waveguide while being absent from other segments.

Low-index-contrast core 213a may comprise doped silica about 0.7 μm thick and about 8 μm wide, with a refractive index in this example between about 1.46 and about 1.48. Low-index-contrast core layers 211 and 212 may also comprise silica or doped silica about 0.6 μm thick, with refractive indices similar to or the same as waveguide core 213a. In the examples shown waveguide cores 213a and 213b are in contact; embodiments wherein cores 213a and 213b are separated by cladding material 220b shall also fall within the scope of the present disclosure or appended claims. Over portions of the waveguide where waveguide core 213b is present and waveguide core 213a is at least a few tens of microns wide, or where waveguide core 213b is greater than 1 to 2 μm wide, the presence of waveguide core 213a and core layers 211/212 may have little or no effect on the optical mode characteristics of the waveguide, which are substantially determined by the size, shape, and index-contrast on core 213b. Over waveguide segments lacking waveguide core 213b, waveguide core 213a and core layers 211/212 may support an optical mode with characteristics substantially determined by their index contrast, dimensions, and relative positions and the index of cladding layers 220a/220b/220c. As the size of waveguide core 213b decreases below about 1 to 2 microns in width until it is no longer present, an optical mode supported by the waveguide undergoes a continuous evolution between these two extremes, and various desired mode sizes, shapes, or other characteristics may be achieved by appropriate combinations of dimensions for the waveguide cores 213a/213b and layers 211/212. Lateral portions of claddings 220a/220b/220c and layers 211/212 may be configured in any of the various ways described hereinabove (i.e. with or without a protruding lateral surface), and the waveguide may be formed to include multiple segments having various of such configurations.

The multiple-core structure of the waveguide of FIGS. 2A-2E enables a wide array of optical designs for achieving various optical performance and/or functionality. As described hereinabove, the high-index-contrast core layer 213b may be readily adapted for substantially spatial-mode-matched optical end coupling with another optical waveguide or semiconductor optical device, or for optical transverse-coupling with another optical waveguide (substantially adiabatic, substantially modal-index-matched, or otherwise), for illuminating a photodetector, or for other purposes. The low-index-contrast core 213a and core layers 211/212 may be readily adapted for substantially spatial-mode-matched optical end-coupling with another optical waveguide or with an optical fiber, or for enabling insertion of various free-space optical components between the ends of two such optical waveguides, or for other purposes. Such adaptations of waveguide core 213a and core layers 211/212 may include the presence of waveguide core 213b at a reduced width (less than about 1 μm wide, for example) to achieve the desired mode characteristics. Substantially adiabatic transitions may be made between these two distinct waveguide types (high-index-contrast core and low-index-contrast multiple-core) by spatially selective patterning of materials forming waveguide cores 213a and 213b.

Figure 3A:
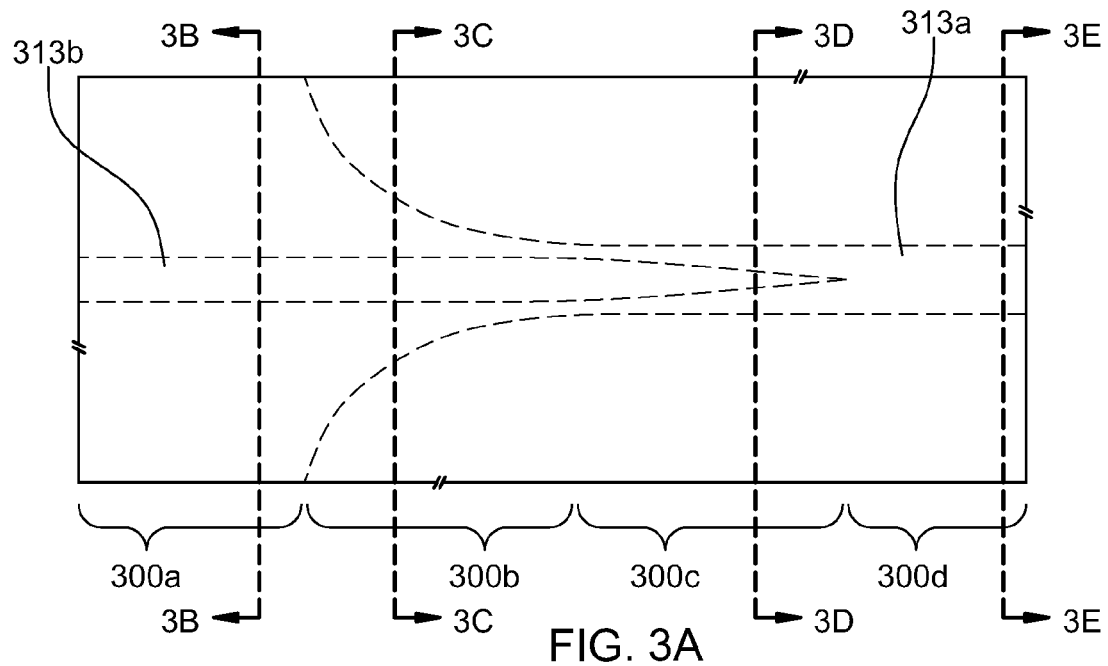
FIGS. 3A-3E are plan and cross-sectional views of an exemplary multiple-core optical waveguide.
Figure 3B:
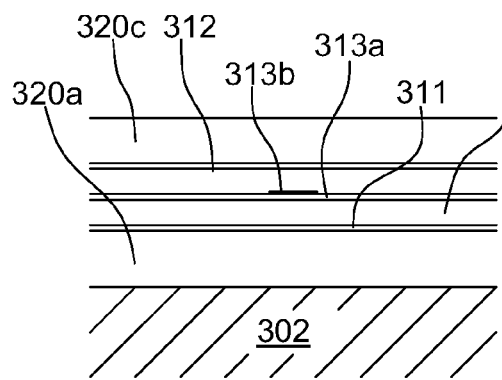
Figure 3C:
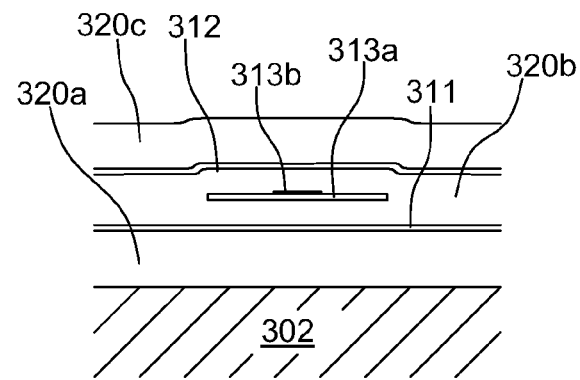
Figure 3D:
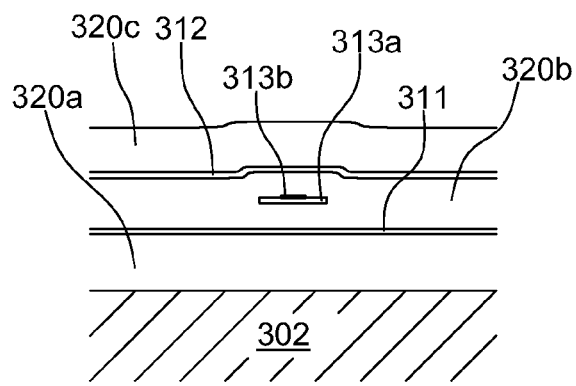
Figure 3E:
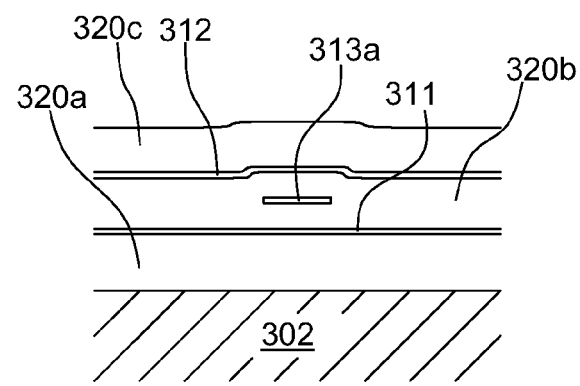
Figure 4A:
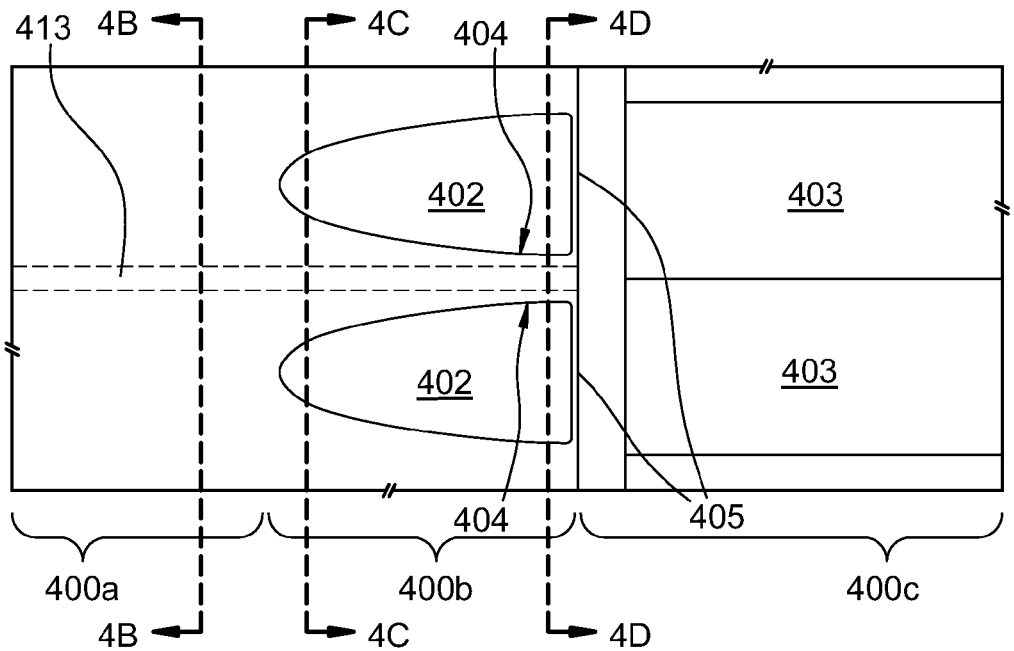
FIGS. 4A-4D are plan and cross-sectional views of an exemplary multiple-core optical waveguide.
Figure 4B:
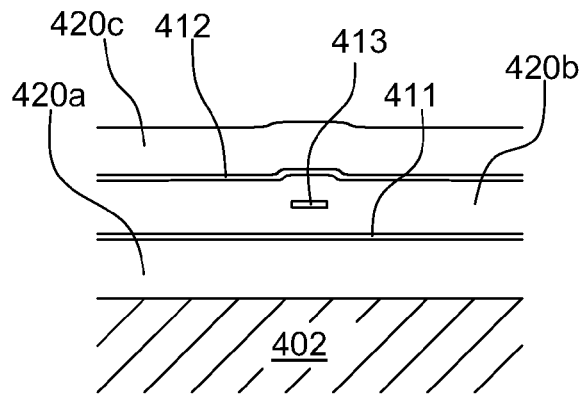
Figure 4C:
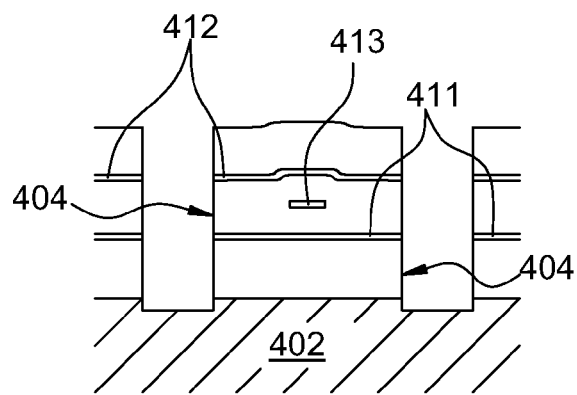
Figure 4D:
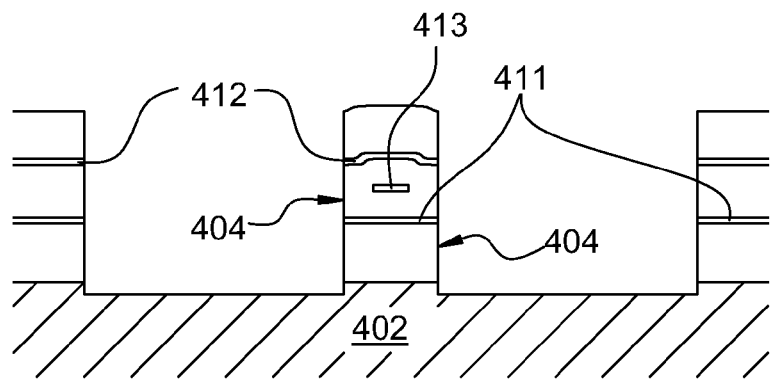

As shown in FIGS. 3A-3E, a high-index-contrast waveguide core 313b a few microns wide may be patterned between substantially uniform low-index-contrast core layers 311/312 and substantially uniform waveguide core material layer 313a over a first segment 300a of a waveguide. Along this first waveguide segment 300a, the high-contrast waveguide core 313b substantially determines the characteristics of a guided optical mode, while layers 311/312/313a have negligible influence on the properties of the waveguide (FIG. 3B). Along a second waveguide segment 300b, waveguide core material layer 313a may be patterned as well as waveguide core 313b. Layer 313b may be patterned to continue the presence of the high-index-contrast core, while layer 313a may be patterned to form the low-index-contrast waveguide core (FIG. 3C). The patterning of layer 313a may be such that the low-index-contrast waveguide core appears gradually (i.e., substantially adiabatically, as shown), or the low-index-contrast core may appear abruptly (not shown). High-contrast core 313b continues to substantially determine the optical characteristics of the waveguide along segment 300b. Along a third segment 300c of the waveguide (FIG. 3D), high-contrast waveguide core 313b is patterned so as to gradually decrease in width along the length of the waveguide until it finally terminates, while low-contrast waveguide core 313a continues to be present along the length of segment 300c. This tapering of high-contrast waveguide core 313b is sufficiently gradual so as to allow a substantially adiabatic transition between a waveguide optical mode characteristic of high-contrast waveguide core 313b at one end of segment 300c to a waveguide optical mode characteristic of low-contrast waveguide core 313a and core layers 311/312 at the other end of segment 300c. A fourth segment 300d of the waveguide includes only low-contrast waveguide core 313a and core layers 311/312, without high-contrast waveguide core 313b (FIG. 3E). Instead of terminating, high-contrast waveguide core 313b may taper to some minimum width (less than about 1 μm, for example; not shown) and then remain at that width along segment 300d, in order to achieve desired characteristics for an optical mode supported by segment 300d. The exemplary optical waveguide shown in FIGS. 3A-3E may serve as an optical mode converter, with optical power propagating in either direction.

In variants of the multiple-core embodiments of FIGS. 2A-2E and 3A-3E, the high-contrast core 213b/313b may be positioned at any suitable vertical position relative to the low-contrast core layers 211/311 and 212/312 and the low-contrast core 313a. Positioning of the high-contrast core 213b/313b at one of the low-contrast layer interfaces may reduce the number of fabrication steps (by eliminating the need to deposit a layer surrounding core 213b/313b in two steps). Placement of high-contrast core 213b/313b in contact with low-contrast core 213a/313a between core layers 211/311 and 212/312 may result in preferential optical coupling into the lowest-order symmetric mode supported by the multiple-core low-contrasts waveguide. Instead of the substantially adiabatic transitions between core high-contrast core 313b and low-contrast core 313a (FIGS. 3A-3E), in other various embodiments cores 313a and 313b may appear and/or terminate abruptly instead of gradually. Such an arrangement may be appropriate for substantially modal-index-matched optical transverse-coupling between the cores, instead of substantially adiabatic transverse-coupling. Many other variants of these embodiments may be contemplated within the scope of the present disclosure.

Figure 2A:
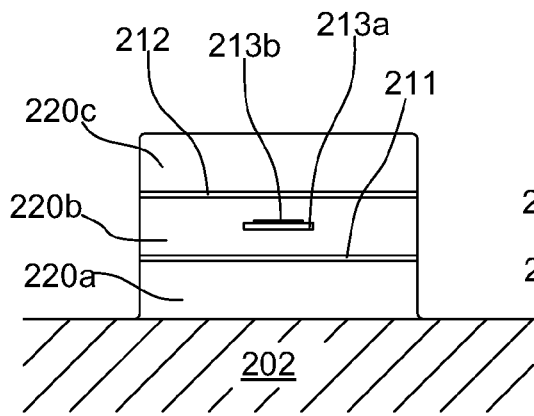
FIGS. 2A-2E are cross-sectional views of an exemplary multiple-core optical waveguides.
Figure 2B:
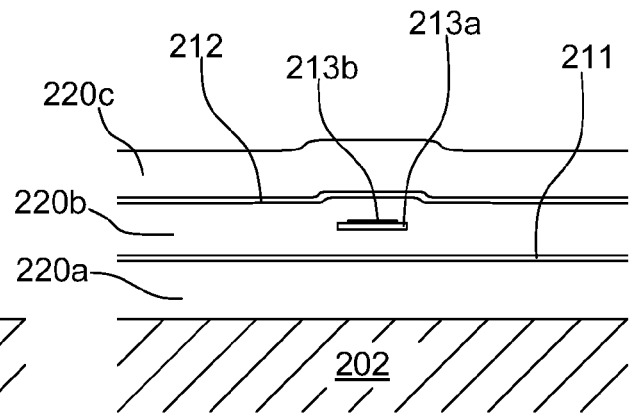
Figure 2C:
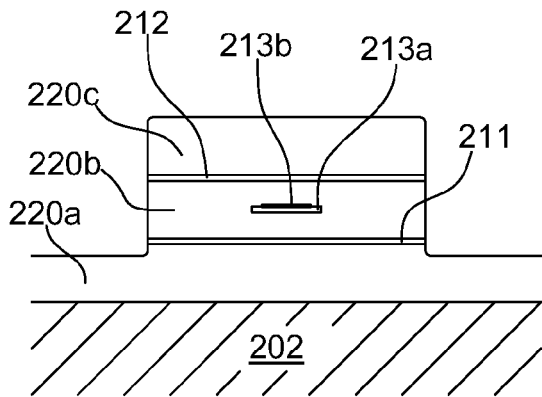
Figure 2D:
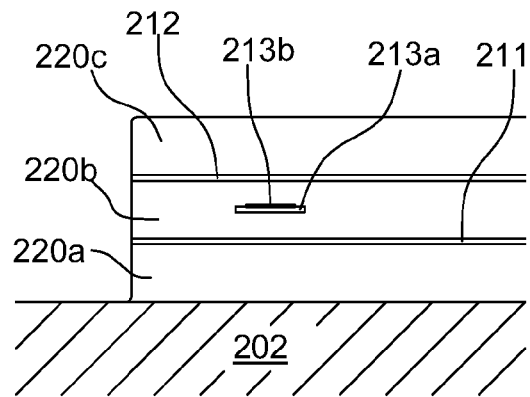
Figure 2E:
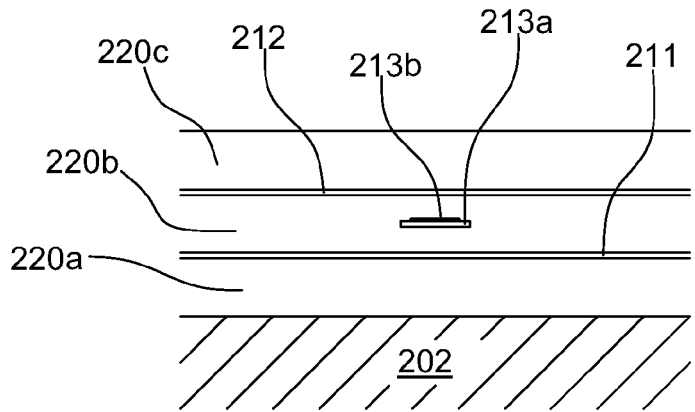

The exemplary waveguides of FIGS. 2A-2E and 3A-3E may be fabricated by processing sequences similar to that described hereinabove for the fabrication of the exemplary waveguides of FIGS. 1A-1E. Fabrication of a waveguide, such as the examples shown in 2A-2E for example, may typically begin with deposition (in order) of lower cladding 220a, core layer 211, and a lower portion of cladding 220b. Cores 213a and 213b may then be formed on the substantially planar upper surface of the deposited cladding 220b, typically by spatially-selective deposition or by substantially uniform deposition followed by spatially-selective removal. If the latter, both material layers may be deposited before either is spatially-selectively processed. If cores 213a and 213b are to be separated by cladding 220b, an intermediate layer of cladding 220b would be deposited after forming one core and before forming the other (with or without planarizing the upper surface of this intermediate cladding layer, as discussed hereinabove). After cores 213a and 213b are formed, additional cladding 220b is deposited, which may or may not comprise the same material as that deposited to form the lower portion of cladding 220b (or the intermediate portion, if any). If a deposition process having a substantial degree of conformality is employed, the upper surface of cladding 220b may exhibit a raised portion directly above waveguide cores 213a and 213b. Upper core layer 212 may be deposited directly on such a non-planar cladding surface, resulting in a corresponding raised portion of core layer 212 directly over waveguide cores 213a and 213b. Upper cladding 220c may be deposited on the non-planar core layer 212, resulting in a corresponding non-planar upper surface of cladding layer 1220c. The multiple-core waveguide resulting from this exemplary fabrication sequence would resemble the exemplary embodiment shown in FIG. 2B. If a deposition process for cladding 220b is employed that yields a substantially flat upper surface regardless of underlying topology, or if a non-planar upper surface of cladding 220b is substantially planarized prior to deposition of core layer 212 thereon, then the resulting multiple-core waveguide would resemble the exemplary embodiment shown in FIG. 2E. In either case (planar or non-planar core layer 212) the resulting waveguide may be further processed to yield protruding lateral surfaces as shown in FIG. 2A, 2C, or 2D, if needed or desired. For relatively low index contrast (less than about 5%), and sufficiently thin waveguide core 213 (less than about 1 μm, for example), a multiple-core waveguide with a non-planar upper core layer 212 exhibits optical performance characteristics substantially similar to those exhibited by a multiple-core waveguide with a substantially planar upper core layer 212.

In the exemplary embodiment of FIGS. 4A-4D, a multiple-core waveguide formed on substrate 402 terminates at a V-groove 403 formed on segment 400c of the substrate. An optical fiber (not shown) received in V-groove 403 may be end-coupled to the waveguide. An optical mode supported by segment 400a of the waveguide may exhibit a somewhat elliptical transverse mode shape elongated in the horizontal dimension. While such a mode might be adequate for end-coupling to another similarly configured waveguide, it might provide less-than-optimal end-coupling to the optical fiber received in groove 403. Terminal segment 400b of the waveguide may be adapted for supporting a more nearly symmetric spatial mode at the end face thereof, thereby enhancing end-coupling to an optical fiber received in V-groove 403. One suitable adaptation is shown in FIGS. 4A-4D, where two areas adjacent segment 400b of the waveguide are etched (or otherwise processed) so as to remove core and cladding materials down to the substrate 402 and to form lateral protruding surfaces 404. The etched areas are arranged so that near the end of the waveguide, core layers 411 and 412 terminate near enough to the lateral edges of waveguide core 413 so that layers 411 and 412 at least in part laterally confine the propagating optical mode. By choosing a suitable width for layers 411 and 412 at the end of the waveguide (the choice based in part on the refractive index of any material, such as an embedding medium or encapsulant, that might be employed subsequently to fill the etched areas), the shape of the propagating mode may be made to better match that of an optical fiber, so as to provide end-coupling between the waveguide and fiber at or above an operationally acceptable level. The transition between waveguide segment 400a and the end of waveguide segment 400b may be made substantially adiabatic, if needed or desired, with core layers 411 and 412 tapering in width along the waveguide toward the waveguide end face. It is often the case that an index matching substance is deposited between the end of the waveguide and the optical fiber, and such index-matching material may be employed to fill the etched areas as well, provided its refractive index is less than the refractive index of the core layers 411 and 412, or no greater than the refractive index of cladding layers 420a, 420b, or 420c. For ease of processing, in some embodiments a thin end wall 405 may be left at the very end of the waveguide; the wall would include layers 420a/420b/420c and 411/412. Such an end wall may be made sufficiently thin (less than about 10 μm, typically only 2-3 μm) so as not to substantially influence the propagating optical mode entering or exiting the end face of the waveguide. Embodiments with or without an end wall shall fall within the scope of the present disclosure or appended claims.

Instead of etching both core layers 411/412 and all claddings 420a/420b/420c in a single step so that core layers 411/412 at least partly laterally confine the propagating optical mode (resulting in a structure such as that of FIGS. 4A-4D, for example), core layers 411/412 may be individually patterned during fabrication of the waveguide so as to taper in width along the waveguide toward the waveguide end face (not shown). As a result of such a fabrication scheme, middle cladding 420b would come into contact with the lateral edges of core layer 411, while upper cladding 420c would come into contact with the lateral edges of core layer 412.

For the typical dimensions and index contrast disclosed hereinabove for exemplary waveguides, it has been observed that the lower and upper core layers 411/412 contribute to lateral confinement at the waveguide end face if they terminate less than about 15 μm from the respective lateral edges of the core 413. Wider core layers 411/412 at the end face do not appear to provide a substantial degree of confinement. The widths of the terminated core layers 411/412 near the waveguide end face may range from about the width of core 413 up to about 30 μm greater than the width of core 413, or may range between about 6 μm wider and about 20 μm wider than core 413, or may range between about 8 μm wider and about 12 μm wider than core 413.

Instead of a V-groove for receiving an optical fiber for end-coupling, substrate 402 have a second optical waveguide formed thereon and positioned for end-coupling (not shown). Alternatively, substrate 402 may be adapted for receiving a second planar optical waveguide formed on a second substrate and subsequently assembled with substrate 402 for end-coupling (not shown). In either of these alternative scenarios, the terminal segment 400b of the waveguide may be adapted in any suitable fashion for enabling end-coupling between the waveguides at or above an operationally acceptable level.

The exemplary embodiments of multiple-core waveguides shown in FIGS. 1A-1E, 2A-2E, 3A-3B, and 4A-4D, and variants thereof, exhibit many of the desirable optical properties exhibited by dual-core waveguides disclosed in earlier-cited application Ser. No. 10/836,641. Adjustment of the index or thickness of the core, core layers, or cladding layers allows adjustment of spatial properties of the propagating optical modes supported by the multiple-core waveguide. The multiple-core waveguide enables efficient end-coupling with other optical waveguides, including other planar optical waveguides and optical fibers. The transverse dimensions of an optical mode supported by the multiple-core waveguide are typically substantially invariant with wavelength (at least over the range of typical near-infrared telecommunications wavelengths). The lowest order mode supported by the multiple-core waveguide may be substantially spatial-mode-matched with another planar waveguide, or with an optical fiber (particularly if adapted as in FIGS. 4A-4D). An optical mode supported by the multiple-core waveguide tends to exhibit a minimum phase front curvature upon propagating some distance beyond an end face of the waveguide. Such a minimum phase fronts tend to occur about 5 to 30 μm away from a waveguide end face, for the typical wavelengths and mode sizes discussed herein. This enables substantial reduction in diffractive optical losses upon end coupling with another planar waveguide or with an optical fiber. Multiple-core low-contrast waveguides may be advantageously implemented where free-space optical propagation between waveguides is required, for example according to the teachings of earlier-cited application Ser. No. 10/682,768. Multiple-core low-contrast waveguides may be advantageously implemented where free-space optical propagation from the end face of the waveguide to a photodetector is required, for example according to the teachings of earlier-cited application Ser. No. 10/661,709. Multiple-core low-contrast waveguides may also exhibit reduced polarization and/or wavelength dependences relative to single-core planar waveguides. While remaining within the scope of the present disclosure and/or appended claims, the indices, thicknesses, and transverse dimensions for the core, core layers, and cladding layers of any of the waveguides of FIGS. 1A-1E, 2A-2E, 3A-3E, and 4A-4D may all be optimized to achieve desired operationally acceptable performance (with respect to optical loss, polarization dependence, wavelength dependence, spatial mode matching, and so forth).

The exemplary low-profile-core waveguides shown in the Figures represent only a sampling of various embodiments of planar waveguides that may be formed with one or more low-profile core(s) or core layers. While exemplary embodiments are shown that include one, two, three, or four waveguide cores or core layers, embodiments including still larger numbers of waveguide cores may be implemented within the scope of the present disclosure. Many other suitable low-profile-core waveguide configurations may be employed, and other suitable materials and/or material combinations used therefor, while remaining within the scope of the present disclosure.

A low-contrast multiple-core waveguide as disclosed herein may exhibit relatively little or substantially negligible polarization or wavelength dependence. Such waveguides may be well-suited for applications where such dependencies may be undesirable or unacceptable. For example, such a substantially polarization-independent waveguide may be employed in an optical receiver in which the polarization state of incoming light may not be known or may vary over time. Such low-contrast multiple-core waveguides may typically support modes more suitable for applications involving free-space optical propagation between adjacent end faces of two waveguides (often through an intervening optical component) than their high-contrast or single-core counterparts. The mode characteristic of a low-contrast multiple-core waveguide may suffer relatively less diffractive optical loss upon transmission between the waveguide end faces.

As noted above, relative to single-core low-contrast waveguides (as in earlier-cited application Ser. No. 10/836,641), multiple-core low-contrast waveguides disclosed herein tend to exhibit modal characteristics that are less dependent or negligibly dependent on polarization or wavelength. In addition, for a given mode size (expressed as $1/e^2$ HW power) in the vertical dimension, an optical mode supported by a single-core low-contrast waveguide has exponentially decaying wings that extend substantially farther from the mode axis than those of an optical mode supported by a multiple-core low-contrast waveguide. As a result, for a given upper and lower cladding thickness, a multiple-core low-contrast waveguide exhibits less optical loss through coupling into the substrate or into the surroundings than a single-core low-contrast waveguide. Or, for a given operationally acceptable level of optical loss, thinner upper and lower cladding layers may be employed with a multiple-core low-contrast waveguide.

Multiple-core low-contrast waveguides offer the fabrication advantages of low-profile and thin cores (shallower etches, more precise lithography, substantially complete filling between etched features, substantially flat upper surfaces of deposited layers, and so on; as disclosed in earlier-cited application Ser. Nos. 10/609,018 and 10/836,641), while providing desirable optical properties characteristic of thicker single cores. For example, if the layers of FIGS. 1A-1E are each deposited and spatially patterned sequentially, then no layer thicker than about 1.0 μm (and typically no thicker than about 0.7 μm) need ever be spatially patterned. The low-profile of patterned core 113, for example, ensures that subsequent deposition of a portion of middle cladding 120b results in a substantially flat upper surface for deposition of core layer 112. A multiple-core low-contrast waveguide as in FIGS. 1A-1E exhibits many of the desirable optical characteristics of a thicker single core, but requires only a single patterning step of a layer typically less than about 1 μm thick, and often less than about 0.7 μm thick.

The term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Terms such "above" and "below", "top" and "bottom", "up" and "down", and so forth shall be defined relative to the substrate, with the waveguide defined as "above" the substrate. Examples of such waveguides include ridge waveguides, buried waveguides, semiconductor waveguides (silicon, silicon-based, III-V, others), other high-index waveguides ("high-index" being above about 2.5), silica-based waveguides (silica, doped silica, and/or other silica-based materials), polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor (silicon, silicon-based, III-V, others), crystalline, silica or silica-based, other glasses, ceramic, metal, and myriad other examples not explicitly set forth herein which may nevertheless fall within the scope of the present disclosure and/or appended claims. For purposes of the foregoing written description and/or the appended claims, "index" may denote the bulk refractive index of a particular material (also referred to herein as a "material index") or may denote an "effective index" $n_{\it eff}$, related to the propagation constant $\beta$ of a particular optical mode in a particular optical element by $\beta=2\pi n_{\it eff}/\lambda$. The effective index may also be referred to herein as a "modal index". "Low-contrast" or "low-index-contrast" shall denote materials having an index contrast less than about 5%, while "high-contrast" or "high-index-contrast" shall denote materials having an index contrast greater than about 5%.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Patent Application Pub. Nos. 2003/0081902, 2004/0052467, or 2004/0264905, for example) for mounting one or more optical sources, lasers, modulators, photodetectors, and/or other optical devices adapted for transverse-transfer of optical power with a suitably adapted PLC waveguide (mode-interference-coupled transverse-transfer or substantially adiabatic transverse-transfer; also referred to as transverse-coupling).

For purposes of the present written description or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing or densification, micro-machining using precision saws or other mechanical cutting/shaping tools, selective metallization or solder deposition, chemical-mechanical polishing for planarizing, any other suitable spatially-selective material processing techniques, combinations thereof, or functional equivalents thereof. In particular, it should be noted that any step involving "spatially-selectively providing" or "spatial patterning" a layer or structure may involve either or both of: spatially-selective deposition or growth, or substantially uniform deposition or growth (over a given area) followed by spatially-selective removal (with or without intervening steps, which may or may not be related to the patterning). Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, or layers "secured to", "connected to", "deposited on", "formed on", or "positioned on" a substrate or layer may make direct contact with the substrate material or layer material, or may make contact with one or more layer(s) or other intermediate structure(s) already present on the substrate or layer, and may therefore be indirectly "secured to", etc, the substrate or layer.

The phrase "operationally acceptable" appears herein describing levels of various performance parameters of optical components or optical devices, such as optical coupling coefficient (equivalently, optical coupling efficiency), optical throughput, undesirable optical mode coupling, optical loss, and so on. An operationally acceptable level may be determined by any relevant set or subset of applicable constraints or requirements arising from the performance, fabrication, device yield, assembly, testing, availability, cost, supply, demand, or other factors surrounding the manufacture, deployment, or use of a particular assembled optical device. Such "operationally acceptable" levels of such parameters may therefor vary within a given class of devices depending on such constraints or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints or requirements. Phrases such as "substantially adiabatic," "substantially spatial-mode-matched," "substantially modal-index-matched," "so as to substantially avoid undesirable optical coupling," and so on as used herein shall be construed in light of this notion of "operationally acceptable" performance.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

While particular examples have been disclosed herein employing specific materials or material combinations and having particular dimensions and configurations, it should be understood that many materials or material combinations may be employed in any of a variety of dimensions or configurations while remaining within the scope of inventive concepts disclosed or claimed herein. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

What is claimed is:

1. A method comprising:
   (i) propagating an optical signal along an optical waveguide as an optical mode supported by the optical waveguide; and
   (ii) transferring the optical signal between the optical waveguide and another optical waveguide or device,
   wherein the optical waveguide comprises:
   (a) a substantially planar waveguide substrate;
   (b) a lower waveguide core layer;
   (c) an upper waveguide core layer;
   (d) a waveguide core between the upper and lower waveguide core layers;
   (e) lower cladding between the substrate and the lower waveguide core layer;
   (f) upper cladding above the upper waveguide core layer; and
   (g) middle cladding between the upper and lower waveguide core layers substantially surrounding the waveguide core,
   and wherein:
   (1) the lower cladding has a refractive index less than refractive indices of the lower waveguide core layer, the upper waveguide core layer, and the waveguide core;
   (2) the middle cladding has a refractive index less than refractive indices of the lower waveguide core layer, the upper waveguide core layer, and the waveguide core;
   (3) the upper cladding has a refractive index less than refractive indices of the lower waveguide core layer, the upper waveguide core layer, and the waveguide core;
   (4) a width of the waveguide core is substantially larger than a thickness thereof;
   (5) an upper surface of the waveguide core is substantially flat;
   (6) the upper and lower waveguide core layers and the waveguide core are arranged so as to together support the optical mode;
   (7) the upper and lower waveguide core layers extend bilaterally substantially beyond the lateral extent of the supported optical mode; and
   (8) the upper and lower waveguide core layers and the waveguide core are arranged so that the supported optical mode is substantially confined bilaterally by the waveguide core, from below by the lower waveguide core layer, and from above by the upper waveguide core layer.

2. The method of claim 1 wherein an upper surface of the middle cladding is substantially planar, and the upper waveguide core layer is substantially planar.

3. The method of claim 1 wherein:
   an upper surface of the middle cladding layer is non-planar and comprises a raised substantially flat portion above the waveguide core; and
   the upper waveguide cladding layer is non-planar, and comprises a raised substantially flat portion above the waveguide core.

4. The method of claim 1 wherein:
   the optical waveguide further comprises a second waveguide core between the upper and lower waveguide core layers;
   a refractive index of the second waveguide core is greater than the refractive indices of the upper cladding, the middle cladding, and the lower cladding;
   a width of the second waveguide core is substantially larger than a thickness thereof;
   an upper surface of the second waveguide core is substantially flat; and
   the first waveguide core and the second waveguide core are arranged one-above-the-other within the middle cladding.

5. The method of claim 4 wherein the waveguide cores are in contact with one another.

6. The method of claim 4 wherein:
   index contrast between the upper core layer and the upper and middle claddings is less than about 5%;
   index contrast between the lower core layer and the lower and middle claddings is less than about 5%;
   index contrast between the first waveguide core and the middle cladding is less than about 5%; and
   index contrast between the second waveguide core and the middle cladding is greater than about 5%.

7. The method of claim 6 wherein the second waveguide core is arranged so as to substantially confine at least one propagating optical mode along at least a first segment of the optical waveguide.

8. The method of claim 7 wherein:
   the second waveguide core tapers in at least one transverse dimension along a second segment of the waveguide in a longitudinal direction away from the first segment of the waveguide toward a third segment of the waveguide;
   the second waveguide core tapers sufficiently gradually so as to substantially avoid optical coupling to unwanted optical modes; and
   the apparatus functions so as to couple the propagating optical signal between the optical modes respectively supported by (i) the second waveguide core along the first segment of the waveguide and (ii) the first waveguide core and the first and second core layers along the third segment of the waveguide.

9. The method of claim 6 wherein:
   the upper, middle, and lower claddings comprise silica or doped silica;
   the upper and lower cores layers and the first waveguide core comprise doped silica; and
   the second waveguide core comprises silicon nitride or silicon oxynitride.

10. The method of claim 9 wherein:
    the upper and lower core layers are each between about 0.3 µm and about 2 µm thick;
    the first waveguide core is between about 0.3 µm and about 1 µm thick and between about 3 µm and about 12 µm wide;
    the second waveguide core is less than about 2 µm wide and less than about 200 nm thick;
    the middle cladding between the lower core layer and the first waveguide core is between about 1 µm and about 3 µm thick; and
    the middle cladding between the upper core layer and the first waveguide core is between about 1 µm and about 3 µm thick.

11. The method of claim 1 wherein:

the optical waveguide terminates at a waveguide end face, and the waveguide core and the upper and lower waveguide core layers each reach the waveguide end face;

the optical signal is transferred between the optical waveguide and the other optical waveguide or device by end-coupling through the end face to the other optical waveguide or device; and the other optical waveguide or device comprises (i) an optical fiber or (ii) a second optical waveguide formed on a second substrate.

12. The method of claim 11 wherein:

the optical waveguide further comprises a tapered segment thereof near the waveguide end face;

the upper and lower core layers taper bilaterally toward the waveguide end face; and the supported optical mode is substantially confined bilaterally at least in part by the upper and lower core layers near the waveguide end face.

13. The method of claim 12, wherein the tapered waveguide segment is bounded bilaterally by respective protruding surfaces, and the upper and lower core layers and the claddings are bounded bilaterally along the tapered segment of the planar optical waveguide by the protruding surfaces.

14. The method of claim 13, wherein the protruding surfaces are substantially covered by a substantially transparent embedding medium or encapsulant.

15. The method of claim 12, wherein:

the upper, middle, and lower claddings comprise silica or doped silica; and the upper and lower core layers and the waveguide core comprise doped silica.

16. The method of claim 15, wherein:

the waveguide core is between about 0.3 μm and about 1 μm thick and between about 3 μm and about 12 μm wide at the waveguide end face;

the upper and lower core layers are each between about 0.3 μm and about 2 μm thick, are each wider than about the width of the waveguide core, and are each less than about 30 μm wider than the waveguide core at the waveguide end face;

the middle cladding between the lower core layer and the first waveguide core is between about 1 μm and about 3 μm thick at the waveguide end face; and the middle cladding between the upper core layer and the first waveguide core is between about 1 μm and about 3 μm thick at the waveguide end face.

17. The method of claim 11 wherein end-coupled optical fiber or planar optical waveguide is longitudinally spaced-apart from the waveguide end face, and diffractive optical coupling loss is less than about 0.3 dB for a longitudinal spacing from the waveguide end-face between about 10 μm and about 25 μm.

18. The method of claim 1 wherein:

index contrast between the upper core layer and the upper and middle claddings is less than about 5%;

index contrast between the lower core layer and the lower and middle claddings is less than about 5%; and index contrast between the waveguide core and the middle cladding is less than about 5%.

19. The method of claim 18 wherein:

the upper and lower waveguide core layers comprise doped silica between about 0.3 μm thick and about 2 μm thick;

the waveguide core comprises doped silica between about 0.3 μm thick and about 1 μm thick and between about 3 μm wide and about 12 μm wide;

the lower, middle, and upper claddings comprise silica or doped silica;

the middle cladding between the lower core layer and the first waveguide core is between about 1 μm and about 3 μm thick; and the middle cladding between the upper core layer and the first waveguide core is between about 1 μm and about 3 μm thick.

20. The method of claim 1 wherein the optical signal propagates along the optical waveguide after being transferred from the other optical waveguide or device.

21. The method of claim 1 wherein the optical signal propagates along the optical waveguide before being transferred to the other optical waveguide or device.

* * * * *